(12) United States Patent
Bonds

(10) Patent No.: US 9,272,238 B1
(45) Date of Patent: Mar. 1, 2016

(54) PLASMA GENERATION THROUGH CERAMIC SUBSTRATE

(71) Applicant: Truman Bonds, Knoxville, TN (US)

(72) Inventor: Truman Bonds, Knoxville, TN (US)

( * ) Notice: Subject to any disclaimer, the term of this patent is extended or adjusted under 35 U.S.C. 154(b) by 36 days.

(21) Appl. No.: 14/271,631

(22) Filed: May 7, 2014

Related U.S. Application Data

(60) Provisional application No. 61/822,145, filed on May 10, 2013.

(51) Int. Cl.
| | | |
|---|---|---|
| *B01D 46/50* | (2006.01) | |
| *B01D 53/32* | (2006.01) | |
| *B01D 53/72* | (2006.01) | |
| *B01J 19/08* | (2006.01) | |
| *H05H 1/24* | (2006.01) | |

(52) U.S. Cl.
CPC . *B01D 53/32* (2013.01); *H05H 1/24* (2013.01)

(58) Field of Classification Search
CPC ........ B01D 53/32; B01D 53/72; B01D 46/50; B01J 19/08; H05H 1/24; H05H 2001/2412
See application file for complete search history.

(56) References Cited

U.S. PATENT DOCUMENTS

| | | | | |
|---|---|---|---|---|
| 6,238,629 | B1 * | 5/2001 | Barankova et al. | 422/186.04 |
| 6,309,610 | B1 * | 10/2001 | Nejezchleb et al. | 422/186.04 |
| 6,517,786 | B1 * | 2/2003 | Best et al. | 422/186.04 |
| 2005/0214181 | A1 * | 9/2005 | Kaneko et al. | 422/186.04 |
| 2007/0172602 | A1 * | 7/2007 | Reniers | 427/569 |

* cited by examiner

*Primary Examiner* — Timothy Vanoy
(74) *Attorney, Agent, or Firm* — Global IP; Esther Roberts Bell

(57) ABSTRACT

The present general inventive concept discloses a ceramic composite substrate that, with proper construction and proper excitation, can generate uniform plasma throughout the substrate for fluid flow treatment to influence a change in its chemical, electrical or physical properties, and method for generating plasma throughout the substrate. The ceramic substrate can include fibrous or sintered semiconducting material, and can include optional structural fiber for support of the semiconducting materials, as well as an optional auxiliary thermal heating source for cleaning excess particulate matter.

23 Claims, 4 Drawing Sheets

PLASMA GENERATION THROUGH CERAMIC SUBSTRATE

CROSS-REFERENCE TO RELATED APPLICATIONS

This invention claims the benefit of U.S. Provisional Application No. 61/822,145 filed May 10, 2013.

STATEMENT REGARDING FEDERALLY-SPONSORED RESEARCH OR DEVELOPMENT

Not Applicable.

BACKGROUND OF THE INVENTION

The present general inventive concept relates generally to a ceramic substrate, and more particularly, to ceramic composite substrate that, with proper construction and proper excitation, can generate uniform plasma throughout the substrate for fluid flow treatment to influence a change in its chemical, electrical or physical properties, and method for generating plasma through the substrate.

Air pollution controls typically involve the filtering out of particulate matter as well as gas phase chemical pollutant treatments. Common methods of particulate removal employed today include candle filters, cyclone separators, electrostatic precipitators, and membrane filters. Gas phase pollution controls include packed beds, scrubbers, absorbers, capturers, incinerators, and condensers. All of these techniques are designed to be implemented at a few hundred degrees C. or less, which is fine for most air pollution sources in operation today. However, emerging technologies and power plant methods such as the production of syngas through gasification of various feedstocks would optimally require syngas filtering at temperatures around 1000 C. None of the above techniques can accomplish this, and there is no established technology that has been implemented on a wide-scale basis that can meet this need.

The present general inventive concept can meet the need of both particular removal and gas phase chemical treatment, all while being self-cleaning at these temperatures. Further, unlike and superior to the known prior art, the present general inventive concept is operational at room temperature and above, including temperatures around 1000 C. A hot syngas stream filtering technique that is both effective and has long term reliability, such as the present general inventive concept, will enable emerging gasification processes to become economically competitive to traditional energy sources.

SUMMARY OF THE INVENTION

The present general inventive concept teaches plasma generation and a method for plasma generation through a ceramic substrate. The present general inventive concept provides increased air gaps within the ceramic substrate, thus allowing more plasma volume to exist within the ceramic substrate, particularly when a fibrous ceramic filter is utilized. The present general inventive concept can provide, inter alia, the concepts and methods to remove particulate matter, deconstruct volatile organic compounds (VOC), and more generally to generate reactive species for material processing, and fluid flow modification. It should be noted that, throughout the application, any reference to fluid modification or fluid stream uses the term "fluid" to represent the general "fluid dynamics" field of science, which includes both liquid and gas phase.

In some exemplary embodiments, the ceramic substrate is fibrous. In other exemplary embodiments, sintered materials may be utilized. The present general inventive concept, in some of its embodiments, can include at least one semiconducting fiber for generating plasma within a plasma reactor. In some embodiments, at least one structural fiber is also included to serve as a structural support to the at least one semiconducting fiber. Some embodiments can include a composite of semiconducting fibers. In some embodiments, a dielectric material can be used in lieu of the semiconducting fiber. In some embodiments, a composite of dielectric materials can be used in lieu of the semiconducting fiber.

It is important to note the distinction between the known art and the present inventive concept relative to the use of dielectric materials and semiconducting fibers. The present general inventive concept is, in exemplary embodiments, composed of semiconducting ceramic fibers with dielectric fibers interwound with structural support fibers, and is an improvement upon traditional "packed bed" type apparatus. This combination of fibers in the present general inventive concept allows for plasma generation without the use of metal electrodes as well as cleansing of the contaminant gas influx through reactive plasma chemistry.

Some embodiments can include a composite of structural fibers. In some exemplary embodiments, a composite of both semiconducting fibers and structural fibers are included within the composite substrate.

In some exemplary embodiments, the sintered material includes dielectric semiconducting pellets. In such embodiments, the pellets can be fused together.

In the above and similar embodiments, the composite provides increased air gaps within the composite substrate, thus allowing more plasma volume to exist within the composite substrate, particularly when a fibrous ceramic filter is utilized. The present general inventive concept can provide, inter alia, the concepts and methods to remove particulate matter, deconstruct volatile organic compounds (VOC), and more generally to generate reactive species for material processing, and fluid flow modification.

The present general inventive concept can generate sufficient plasma volume so as to create a plasma "filter" of substantial thickness which further enhances the efficiency of the plasma treatment process. In some exemplary embodiments, the plasma filter created by the present general inventive concept can be a thickness of 1 millimeter. The present general inventive concept provides sufficient structural integrity within the ceramic structure to support a plasma filter from 1 millimeter thick up to 1 meter thick. This enhanced plasma volume provides more robust filtration than is currently available in the known prior art, both with respect to increased surface area exposure and optimal quality outcome.

In processes of removing particulate matter, should the particulate load become so dense as to inhibit the plasma's ability to clean, an optional auxiliary thermal heating source could be included in the overall present general inventive concept. This auxiliary thermal heating source could be configured to remove the excess particulate matter and then stand down, thus allowing the plasma to resume particulate removal. The optional auxiliary thermal heating source could function periodically, as-needed, or on command. The auxiliary thermal heating source could be utilized during system operation or, alternatively, during a system stand down for maintenance and cleaning purposes.

In some embodiments of the present general inventive concept, ceramic binder material may be required in the fibrous substrate. The ceramic binder material is, in essence, the glue that holds the structural fibers (fibrous substrate) together; without the ceramic binder material, the fibrous substrate could fall apart. This ceramic binder material could be, for example, mullite, alumina, silicon dioxide, or silicon carbide. The amount of binder material can range from between 50% to 150%—by weight or mass, not volume—with the exact percentage depending on the amount of additional mechanical strength one desires to add to the fibrous substrate.

In embodiments of the present general inventive concept where a dielectric material is present, it should be noted that these dielectric materials can include, as some examples, ferroelectric or paraelectric materials. In exemplary embodiments, impedance matching of the plasma generating substrate to the power supply enhances the proper transfer of power, thus optimizing the quality of the overall process. In addition, and optimally, a high dielectric constant provides uniformity; dielectric constants greater than five are considered high and, thus, optimal.

BRIEF DESCRIPTION OF THE DRAWINGS

A wide variety of potential embodiments will become more clearly understood from the following detailed description of certain exemplary embodiments, read together with the accompanying drawings in which.

DETAILED DESCRIPTION OF THE INVENTION

The following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

Figure 1:
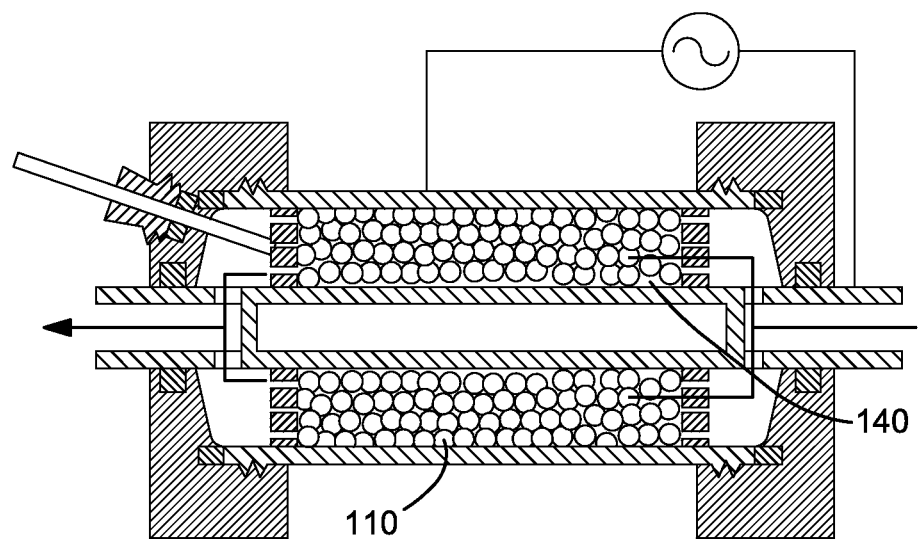
FIG. 1 is a diagram illustrating a simplified drawing of a traditional packed-bed plasma reactor in cross-section from an axial view.

FIG. 1 illustrates a simplified drawing of a traditional packed-bed plasma reactor in cross-section from an axial view. Pellets 110 are placed in reasonably close proximity to each other, with air gaps 140 interspersed throughout.

Figure 2:
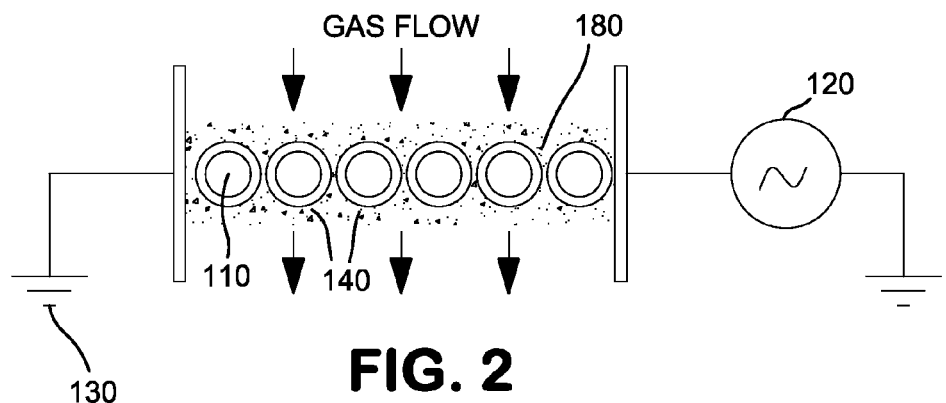
FIG. 2 is a diagram illustrating a simplified drawing of a traditional packed-bed plasma reactor in cross-section from a terminal view.

FIG. 2 illustrates a simplified drawing of a traditional packed-bed plasma reactor in cross-section from a terminal view and enlarged to show detail. Pellets 110 are placed in reasonably close proximity to each other and gaps 140 are extant between pellets 110. Gas is directed per the directional arrows through the pellets 110. Pellets 110 can be composed of a conductive core and a dielectric outer layer, a solid dielectric material, or, alternatively, a homogeneous semiconductive material. The electric field generated by the power supply 120 and electrode 130 induces electric potential differences between the pellets 110. With the appropriate pellet size, excitation, and material properties, plasma 180 can be generated in the air gaps 140 between the pellets 110.

Figure 3:
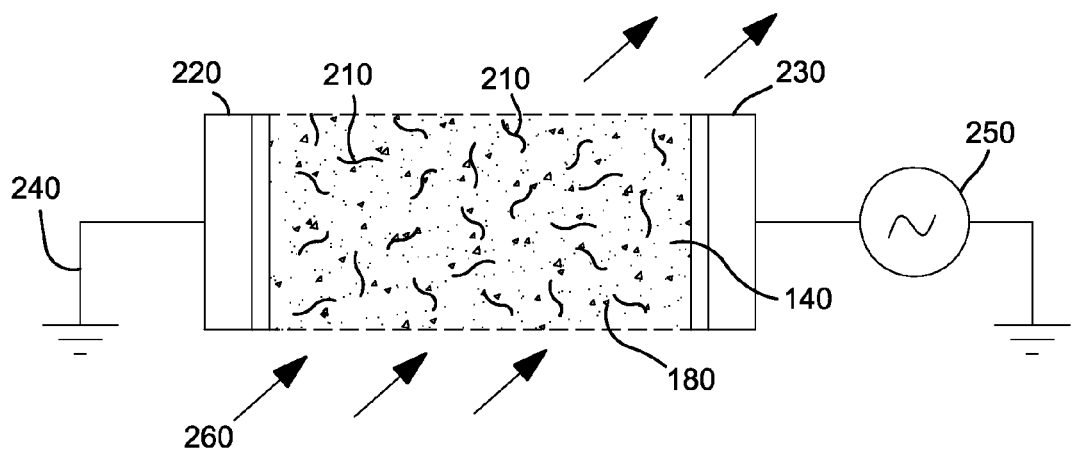
FIG. 3 is a diagram illustrating an example embodiment of the present general inventive concept, showing a ceramic composite fibrous substrate, including semiconducting fibers, within a plasma reactor.

FIG. 3 illustrates an exemplary embodiment of the present general inventive concept, enlarged to show detail, which includes at least one semiconductive fiber 210 between a first electrode 220 and a second electrode 230. As established and known in the art, the first electrode 220 is connected to a ground 240 and the second electrode 230 is connected to a high voltage source 250. Alternatively, and also known in the art, in some embodiments, first electrode 220 and second electrode 230 can be connected to separate high voltage sources of opposing polarity (not shown). Air gaps 140 reside throughout, between the semiconductive fiber 210. Upon inducing connectivity, known in the art, between first electrode 220 and second electrode 230, so as to create activated plasma 180, and upon introducing gas flow 260 through the semiconductive fiber 210 and composite substrate, filtration can result.

Figure 4:
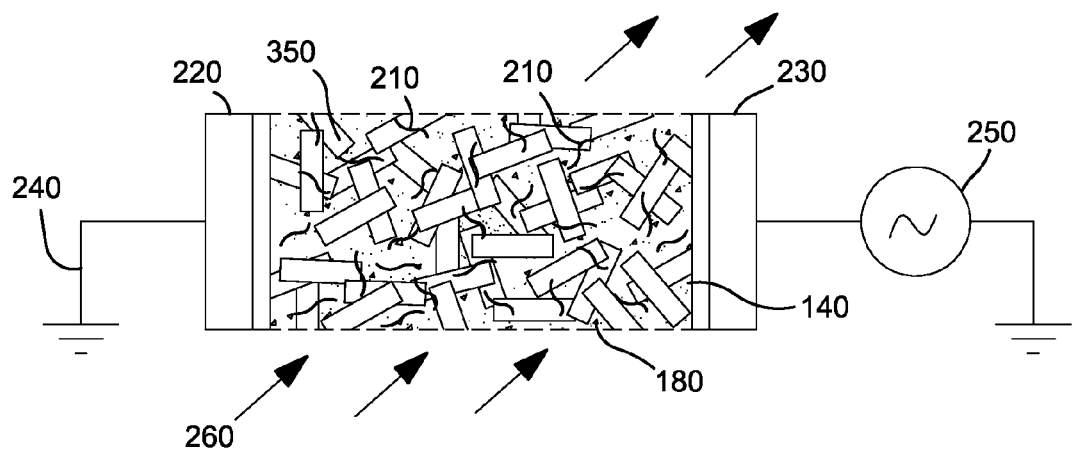
FIG. 4 is a diagram illustrating an example embodiment of the present general inventive concept, showing a ceramic composite fibrous substrate, including semiconducting fibers and nonconducting structural support fibers, within a plasma reactor.

FIG. 4 illustrates an exemplary embodiment of the present general inventive concept, enlarged to show detail, which includes at least one semiconductive fiber 210 and at least one structural fiber 350 between a first electrode 220 and a second electrode 230. As established and known in the art, the first electrode 220 is connected to a ground 240 and the second electrode 230 is connected to a high voltage source 250. Alternatively, and also known in the art, in some embodiments, first electrode 220 and second electrode 230 can be connected to separate high voltage sources of opposing polarity (not shown). Air gaps 140 reside throughout, between the semiconductive fiber 210 and structural fiber 350. Upon inducing connectivity, known in the art, between first electrode 220 and second electrode 230, so as to create activated plasma 180, and upon introducing gas flow 260 through the semiconductive fiber 210 and composite substrate, filtration can result.

Figure 5:
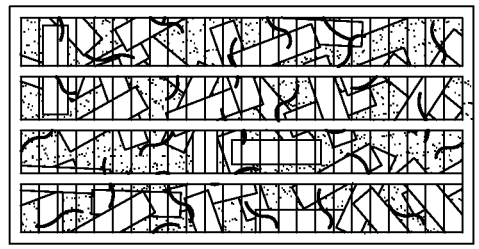
FIG. 5 is a diagram illustrating an example embodiment of the present general inventive concept, showing a ceramic composite fibrous substrate in a generally linear shape.

FIG. 5 illustrates the present general inventive concept in one exemplary configuration, namely, a generally planar, panel composite substrate.

Figure 6:
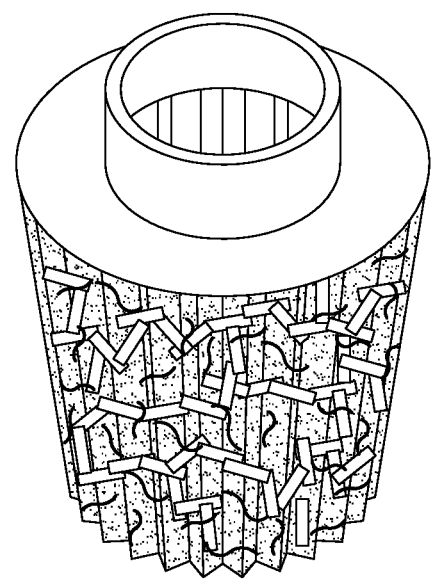
FIG. 6 is a diagram illustrating an example embodiment of the present general inventive concept, showing a ceramic composite fibrous substrate in a generally cylindrical shape.

One unique feature provided by the present general inventive concept is the diverse configurations available due to the structural support fibers in certain exemplary embodiments. FIG. 6 illustrates the present general inventive concept in one exemplary configuration, namely, a generally cylindrical composite substrate.

In some exemplary embodiments, the at least one semiconductive fiber 210 is further defined to be a multitude of semiconductive fibers 210 to increase the number of air gaps 140 throughout the composite substrate, thus increasing plasma volume extant within the substrate to provide for enhanced filtration by the composite substrate. In some exemplary embodiments, an additional fiber—a structural fiber 350 (see FIG. 4)—is included within the present general inventive concept. The structural fiber 350 provides support to the semiconductive fiber 210. In some exemplary embodiments, this structural fiber 350 is further defined to connect between the first electrode 220 and the second electrode 230, to provide support both to the semiconductive fiber 210 and the entire composite substrate. In some exemplary embodiments, the at least one semiconductive fiber 210 may be particles. In some embodiments, the at least one semiconductive fiber 210 may be pellets. In some embodiments, the at least one semiconductive fiber 210 may be porous matter.

One exemplary embodiment of the present general inventive concept is herein described that references FIG. 4. Note as in previous descriptions that the area between first electrode 220 and second electrode 230 has been illustrated as if zoomed in with a microscope. For reference purposes, the typical width of structural fiber 350 is on the order of microns. High voltage source 250 can be an RF high voltage power source (including impedance matching elements) operating at 13.56 MHz and 10 kV. Second electrode 230 can be a conductive layer applied to the ceramic filter media which could be composed of a high temperature electrically conducting epoxy or graphite-based adhesive applied directly to the ceramic media, therefore coming into direct contact with the at least one semiconductive fiber 210. The spacing between the semiconductive fiber 210 is dependent on the exact characteristics of the fiber. One example of semiconductive fiber 210 is silicon carbide fiber. Silicon carbide fiber has sufficient conducting properties to couple and transmit the high voltage, high frequency power signal through the media to the first electrode 220. Between the semiconductive fiber 210 and in any air gaps 140, a plasma 180 can be generated with the correct application of impedance matching and power signal. In some exemplary embodiments, the media can be structurally enhanced by adding an optional structural fiber 350, such as alumina fibers. These structural fibers can be held together with an optional binder material such as silicon dioxide (not shown). This example, when activated can clean the structural fiber 350 through oxidation of particulate matter, and treat the incoming gas flow 260 through reactive plasma chemistry.

Still other embodiments will become readily apparent to those skilled in this art from reading the above-cited detailed description in view of all the drawings. It is noted that the simplified diagrams do not illustrate all the various connections and assemblies of the various components, however, those skilled in the art will understand how to implement such connections and assemblies, based on the illustrated components, figures, and descriptions provided herein.

While the present general inventive concept has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

It is also noted that numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A ceramic composite fibrous substrate to replace packed bed filtration systems, said substrate comprising:
   at least one semiconductive fiber contained between at least two electrodes, said electrodes further defined to be a first electrode and a second electrode, said first electrode and said second electrode being connected so as to form a charged circuit to activate said at least one semiconductive fiber to facilitate the production of plasma.

2. The ceramic composite fibrous substrate of claim 1, said ceramic composite fibrous substrate further containing at least one structural fiber for providing support to said at least one semiconductive fiber.

3. The ceramic composite fibrous substrate of claim 1, said ceramic composite fibrous substrate further containing at least one structural fiber for providing support to said at least one semiconductive fiber, said at least one structural fiber being oriented so as to interconnect between said first electrode and said second electrode in order to provide structural integrity for said semiconductive fiber between said first electrode and said second electrode.

4. The ceramic composite fibrous substrate as in claim 1, 2, or 3, further comprising an auxiliary thermal heating source for cleaning.

5. The ceramic composite fibrous substrate as in claim 1, 2, or 3, wherein said semiconductive fiber is defined to be particles.

6. The ceramic composite fibrous substrate as in claim 1, 2, or 3, wherein said semiconductive fiber is defined to be pellets.

7. The ceramic composite fibrous substrate as in claim 1, 2, or 3, wherein said semiconductive fiber is defined to be porous structure.

8. A ceramic composite fibrous to replace packed bed filtration systems, said substrate comprising:
   at least one dielectric material contained between at least two electrodes, said electrodes further defined to be a first electrode and a second electrode, said first electrode and said second electrode being connected to so as to form a charged circuit to activate said at least one dielectric material to facilitate the production of plasma.

9. The ceramic composite fibrous substrate of claim 8, said fibrous substrate further containing at least one structural fiber for providing support to said at least one dielectric material.

10. The ceramic composite fibrous substrate of claim 8, said ceramic composite fibrous substrate further containing at least one structural fiber for providing support to said at least one dielectric material, said at least one structural fiber being oriented so as to interconnect between said first electrode and said second electrode in order to provide structural integrity for said dielectric material between said first electrode and said second electrode.

11. The ceramic composite fibrous substrate as in claim 8, 9, or 10, further comprising an auxiliary thermal heating source for cleaning.

12. The ceramic composite fibrous substrate as in claim 8, 9, or 10, wherein said dielectric material is defined to be particles.

13. The ceramic composite fibrous substrate as in claim 8, 9, or 10, wherein said dielectric material is defined to be pellets.

14. The ceramic composite fibrous substrate as in claim 8, 9, or 10, wherein said dielectric material is defined to be porous structure.

15. The ceramic composite fibrous substrate as in claim 8, 9, or 10, wherein said dielectric material is defined as a ferroelectric material.

16. The ceramic composite fibrous substrate as in claim 8, 9, or 10, wherein said dielectric material is defined as a paraelectric material.

17. A method for particulate control for use in packed bed filtration-type applications, said method comprising the steps of:
   (a) exciting a ceramic composite fibrous substrate to generate a uniform plasma, said ceramic fibrous substrate defined to contain at least one semiconductive fiber; and
   (b) introducing gas flow into said ceramic fibrous substrate and said uniform plasma.

18. A method for fluid stream chemical and physical modification for use in packed bed filtration-type applications, said method comprising the steps of:
   (a) exciting a ceramic fibrous substrate to generate a uniform plasma, said ceramic fibrous substrate defined to contain at least one semiconductive fiber; and
   (b) introducing gas flow into said ceramic fibrous substrate and said uniform plasma.

19. A method for generation of reactive species for materials processing for use in packed bed filtration-type applications, said method comprising the steps of:
   (a) exciting a ceramic fibrous substrate to generate a uniform plasma, said ceramic fibrous substrate defined to contain at least one semiconductive fiber; and
   (b) introducing gas flow into said ceramic fibrous substrate and said uniform plasma.

20. A method for particulate control for use in packed bed filtration-type applications, said method comprising the steps of:
   (a) exciting a ceramic composite fibrous substrate to generate a uniform plasma, said ceramic fibrous substrate defined to contain at least one dielectric material; and
   (b) introducing gas flow into said ceramic fibrous substrate and said uniform plasma.

21. A method for fluid stream chemical and physical modification for use in packed bed filtration-type applications, said method comprising the steps of:
   (a) exciting a ceramic fibrous substrate to generate a uniform plasma, said ceramic fibrous substrate defined to contain at least one dielectric material; and
   (b) introducing gas flow into said ceramic fibrous substrate and said uniform plasma.

22. A method for generation of reactive species for materials processing for use in packed bed filtration-type applications, said method comprising the steps of:
   (a) exciting a ceramic fibrous substrate to generate a uniform plasma, said ceramic fibrous substrate defined to contain at least one dielectric material; and
   (b) introducing gas flow into said ceramic fibrous substrate and said uniform plasma.

23. A method as in claim 17, 18, 19, 20, 21, or 22, further comprising the step of heating said substrate with an auxiliary thermal heating source for cleaning.

* * * * *